United States Patent [19]
Malinge et al.

[11] Patent Number: 4,733,428
[45] Date of Patent: Mar. 29, 1988

[54] TOOL FOR CLEANING AN OPTICAL SURFACE

[75] Inventors: Jean L. Malinge, Sevres; Roger Collignon, Igny; Rene Dousset, Versailles, all of France

[73] Assignee: Amphenol Corporation, Wallingford, Conn.

[21] Appl. No.: 927,026

[22] Filed: Nov. 5, 1986

[30] Foreign Application Priority Data

Nov. 12, 1985 [FR] France ................ 85 16669

[51] Int. Cl.⁴ .................... B08B 3/02; B08B 5/00
[52] U.S. Cl. .......................... 15/302; 15/304; 15/322; 15/345
[58] Field of Search .............. 15/302, 304, 322, 345

[56] References Cited

U.S. PATENT DOCUMENTS

| 2,846,710 | 8/1958 | Haka | 15/345 |
| 3,154,890 | 11/1964 | Lemelson | 15/321 X |
| 3,942,213 | 3/1976 | Hoener | 15/302 |
| 3,964,123 | 6/1976 | Pettersson | 15/345 |
| 4,341,568 | 7/1982 | Christensen | 15/304 X |
| 4,637,089 | 1/1987 | Schwarz | 15/210 R X |

Primary Examiner—Chris K. Moore
Attorney, Agent, or Firm—Bacon & Thomas

[57] ABSTRACT

A cleaning tool for an optical surface, particularly well adapted to the cleaning of optical surfaces which access is difficult.

The cleaning tool includes an injector (8) which can send a cleaning liquid, and then a drying gas, under pressure onto the optical surface (2), and a jacket (9) for the evacuation of the cleaning and drying fluids. The tool has a neck (13) to fit onto an optical tip associated with an optical fiber.

7 Claims, 3 Drawing Figures

FIG_1
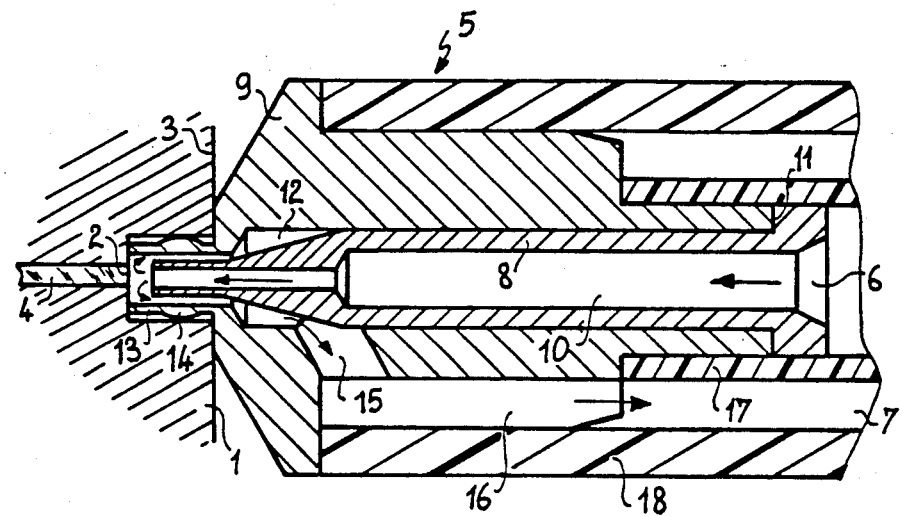
FIG_2
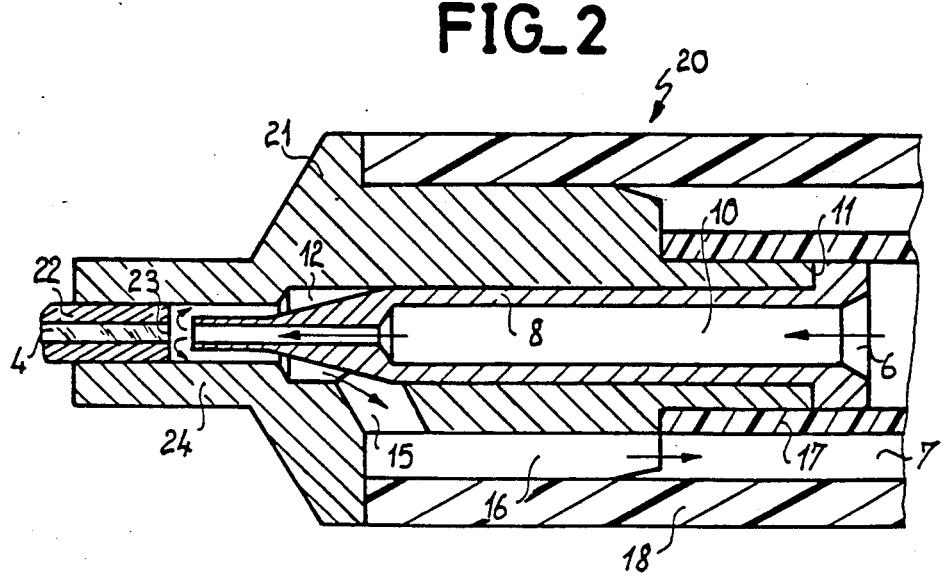

FIG_3
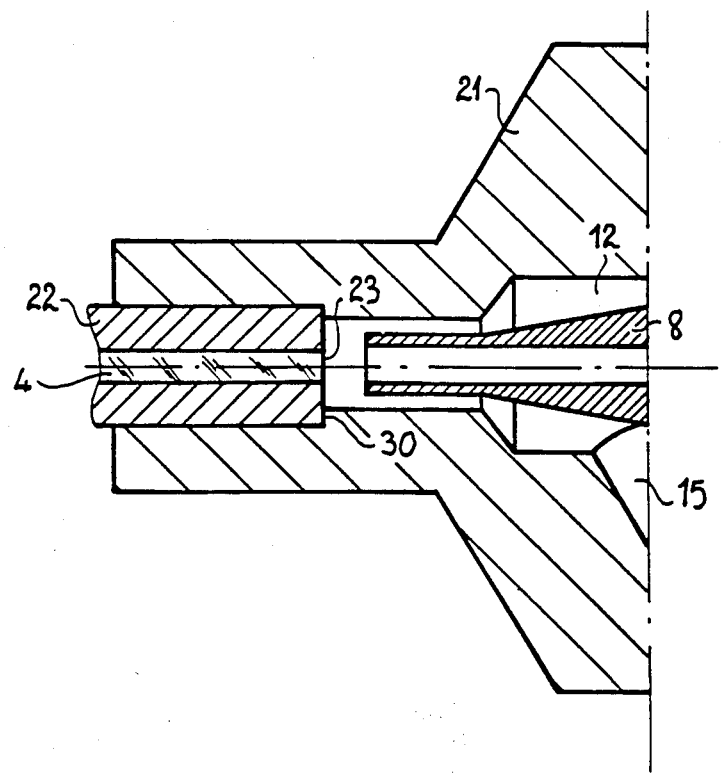

TOOL FOR CLEANING AN OPTICAL SURFACE

BACKGROUND OF THE INVENTION

1. Field of the Invention

This invention relates to a tool for cleaning an optical surface and is particularly well adapted to the cleaning of optical surfaces to which access is difficult.

2. Description of the Prior Art

The considerable development of devices utilizing links by optical fibers has led to the multiplication of connecting elements such as tips and connectors. Likewise, attempts are being made to miniaturize all these devices in order to combine them with electronic processing circuits so that it is possible to find mixed connectors combining electrical and optical functions.

It is often necessary for various reasons to disconnect the optical links, which can lead to contamination of the optical surfaces. It is important, then, to protect the optical surfaces in order to limit linkage losses by cleaning them as well as possible.

To do this it has been common up to now to use rather rudimentary means such as a cotton swab or a piece of felt. This has the drawback that fibers of cotton or felt are often left behind, and most of the impurities collect on the periphery of the optical surface. These defects are further aggravated when the optical surface to be cleaned lies at the bottom of a narrow bore. It is then necessary to trim the cotton swab which has a tendency to further unravel at the cotton tip.

It would be desirable to provide a cleaning tool which remedies these drawbacks.

In accordance with the present invention, there is provided a cleaning tool for an optical surface, characterized in that it comprises an injection duct for a cleaning fluid sent under pressure in the direction of the optical surface, and an evacuation duct for the fluid, and in that it comprises means for positioning of the tool relative to the optical surface.

The ducts for injection and evacuation will advantageously permit drying the cleaned optical surface by circulation of gas under pressure.

The invention provides a cleaning tool that fits on the optical devices to be cleaned. The cleaning comprises injecting a fluid under pressure onto the optical surfaces. This cleaning fluid can simply be a gas such as air. This can also be a liquid, in which case it is preferable to inject a drying gas afterward.

It is convenient to embody the tool by assembly of two elements, a first element or injector in which the injection duct is formed, and a second element or jacket in which the evacuation duct is formed.

The cleaning will be all the more effective if the cleaning fluid is injected in the axis of the optical surface and if the evacuation of the fluid takes place on the sides. It is thus preferable that the two elements constituting the tool be of a generally cylindrical form, that they be pierced on either side with an axial bore and that the injector be lodged in the bore in the jacket.

When a female tip is to be cleaned, it is advisable for the length of the neck of the jacket to be equal to the depth of the bore of the female tip.

When a male tip is to be cleaned, the neck of the jacket will have an inner diameter adjusted to the diameter of the male tip so as to cover it. It will preferably be provided with means for retaining the male tip so that a certain spacing will be maintained between the optical surface and the front end of the injector.

BRIEF DESCRIPTION OF THE DRAWINGS

FIG. 1 represents a cleaning tool according to the invention, adapted for female tips.

FIG. 2 represents a cleaning tool according to the invention, adapted for male tips.

FIG. 3 is a detailed view of a cleaning tool for male tips.

DESCRIPTION OF THE PREFERRED EMBODIMENTS

The optical surfaces to be cleaned may take a variety of forms. They can be flush with a reference surface, in which case the adaptation of the tool to the optical device will be relatively easy. However, they are often outstanding or recessed from such surface as in the case of male or female tips.

FIG. 1 represents a cleaning tool according to the invention, which is particularly well adapted to the case of a female tip. The tool is represented in position on the tip. The optical device 1 has an optical surface 2 which is recessed relative to plane 3 and therefore constitutes a female tip. Optical surface 2 may be formed in various ways. It can simply be the end of an optical fiber alone or also associated with an element such as a lens. In any event the optical means carrying light beams are schematically represented under the general reference 4.

Tool 5 is a device comprising an injection orifice 6 for cleaning and drying fluids and an evacuation orifice 7 for these same fluids. It comprises a part 8 for projecting these fluids on optical surface 2 and a part 9 for evacuation of these fluids. It is advantageous to make tool 5 from a plurality of easily assembleable elements of a general cylindrical form. Part 8 can then be a cylinder pierced axially with a bore 10 and having at the rear (that is the side through which the fluids are injected) a shoulder 11. Shoulder 11 makes it possible, when elements 8 and 9 are assembled, to keep the front of element 8 slightly recessed relative to the front of element 9. Thus, as represented in FIG. 1, optical surface 2 can easily be isolated and cleaned.

Element 9, or jacket, is likewise pierced with an axial bore 12. It is prolonged by a part of reduced diameter, or neck, 13, adaptable to the female tip to be cleaned. In the part corresponding to the neck, the diameter of bore 12 is likewise reduced in order to meet the geometric requirements of the female tip. The length of neck 13 is likewise subject to the depth of the female tip. It is advantageous, as a matter of fact, that the front end of the neck rest on the bottom of the tip so that the fluids may be properly evacuated and so that jacket 9 will rest on plane 3 to assure good stability for the tool during the cleaning operation. The neck can be provided with a swivel 14 to permit centering the tool in the tip without warping the bore of the tip by friction of the neck on the side of the bore. Jacket 9 also has a hole 15 opening on one side in the bore 12 and on the other side in a longitudinal groove 16 made in the perimeter of the jacket.

Element 8, or injector, has a front end of a limited diameter in order to extend as close as possible to the optical surface 2. The same is true of its bore 10 whose other end is flared to permit a better circulation of the fluids. The latter circulate in the manner indicated by the arrows. For example, a cleaning liquid can be injected through entrance 6. It arrives directly on the optical surface 2 and is evacuated through the space comprised between elements 8 and 9 toward hole 15 and groove 16 and then to the outside. Drying can be obtained by injection of air.

The tool can be fitted on a syringe or on a compressed air system depending on the size of the surface to be cleaned and the necessary pressure. By sending the cleaning liquid and the drying fluid under pressure, a localized overpressure is created on the surface to be cleaned, which permits an effective cleaning thereof. The contaminants are then carried to the outside.

FIG. 1 also shows a part of sleeves 17 and 18, made of plastic, for example, which permit channelizing the fluids used. The parts of these sleeves which are not shown are a function of the injection and evacuation device adopted (syringe, compressed-air feed line, etc.) and can be easily determined by the user. All the elements represented in FIG. 1 can be assembled by friction fit, by gluing, screwing or in any other way. Elements 8 and 9 are preferably metallic, They could be made in one piece but it is simpler to make them in two parts.

FIG. 2 represents a cleaning tool according to the invention adapted for male tips. The tool, reference 20, differs from the one described above by the form given to the front part of the jacket 21 where the neck 24 covers the male tip 22. All the other elements are identical to those in FIG. 1 and bear the same reference numerals. Male tip 22 incorporates an optical surface 23 which, in order that the cleaning may be correct, should not be either too close to the front end of injector 8 or too far away from this end. In the case represented in FIG. 2, it is difficult to appreciate the distance separating optical surface 23 from the end of the injector. In specific cases this drawback can be remedied if the projecting length of the tip is known and jacket necks of a predetermined length are chosen.

It is possible to ensure a certain distance between the optical surface and the injector by providing means of retention of the tip. These means of retention can be, as represented in FIG. 3, which is a detail view of a cleaning tool, a shoulder 30 embodied in the axial bore of jacket 21 and on which the male tip abuts.

Another advantage of the invention is that it can easily be used in the field without any particular precaution of use. The cleaning liquid can simply be injected with the aid of a syringe or a compressed-air cylinder, the air then being used for drying.

It can be seen that the present invention provides a relatively simple tool for cleaning optical surfaces, especially surfaces associated with optical fibers.

We claim:

1. A cleaning tool for an optical surface comprising an injection duct for a cleaning fluid sent under pressure in the direction of said optical surface and an evacuation duct for said fluid, and means for positioning said tool relative to said optical surface wherein said injection duct is formed in an injector and said evacuation duct is formed in a jacket, wherein said injector and jacket are generally cylindrical in form and pierced from end to end with an axial bore and the injector is lodged in the bore of said jacket such that there is a space between the front end of the injector and the jacket, wherein said evacuation duct is formed, at least in part, by the space between the front end of the injector and said jacket and wherein said evacuation duct of said jacket comprises a longitudinal groove formed on the periphery of said jacket and a hole pierced in said jacket and connecting said groove with said space.

2. A cleaning tool for an optical surface comprising an injection duct for a cleaning fluid sent under pressure in the direction of said optical surface and an evacuation duct for said fluid and means for positioning said tool relative to said optical surface wherein said injection duct is formed in an injector and said evacuation duct is formed in a jacket, wherein the means for positioning comprises a neck situated at the front part of said jacket, with the front end of said injector being recessed relative to said front end of said neck and wherein in the case of cleaning a female tip having said optical surface, the length of said neck corresponds to the depth of the bore of said female tip, said neck surrounding said optical surface when said tool is in operating position and in the case of cleaning a male tip having said optical surface, said neck of said jacket has an inner diameter adjusted to the diameter of said male tip in order to cover said male tip.

3. A cleaning tool according to claim 2, characterized in that said neck comprises a swivel adjusted to the diameter of the bore in said female tip.

4. A cleaning tool according to claim 2, characterized in that said axial bore of said jacket has a reduced diameter in the area of said neck, that said injector has a reduced diameter at its front end and that said axial bore of said injector has a reduced diameter adjacent the front end of said injector.

5. A cleaning tool according to claim 2, characterized in that it comprises means of retention of said male tip in order to maintain a predetermined distance between said optical surface and the front end of said injector.

6. A cleaning tool according to claim 5, characterized in that said means of retention comprises a shoulder in the axial bore of said jacket.

7. A cleaning tool according to claim 2, characterized in that a shoulder is provided at the rear of said injector against which the rear of said jacket abuts, whereby said front end of said injector is maintained in its recessed position relative to said jacket.

* * * * *